United States Patent
Okuyama et al.

(10) Patent No.: US 9,651,207 B2
(45) Date of Patent: May 16, 2017

(54) OXYCHLORIDE PHOSPHOR, LIGHT EMITTING DEVICE, LIGHTING APPARATUS, AND VEHICLE

(71) Applicant: Panasonic Intellectual Property Management Co., Ltd., Osaka (JP)

(72) Inventors: Kojiro Okuyama, Nara (JP); Mitsuru Nitta, Osaka (JP); Osamu Inoue, Osaka (JP); Seigo Shiraishi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 399 days.

(21) Appl. No.: 14/550,746

(22) Filed: Nov. 21, 2014

(65) Prior Publication Data

US 2015/0153010 A1    Jun. 4, 2015

(30) Foreign Application Priority Data

Dec. 3, 2013 (JP) ................. 2013-249806
Jul. 31, 2014 (JP) ................. 2014-156318

(51) Int. Cl.

| | |
|---|---|
| *F21V 11/00* | (2015.01) |
| *F21K 99/00* | (2016.01) |
| *F21S 8/10* | (2006.01) |
| *C09K 11/77* | (2006.01) |
| *F21K 9/64* | (2016.01) |

(Continued)

(52) U.S. Cl.
CPC ............ *F21K 9/56* (2013.01); *C09K 11/7734* (2013.01); *F21K 9/64* (2016.08); *F21S 48/1145* (2013.01); *F21S 48/1225* (2013.01); *F21S 2/00* (2013.01); *F21V 9/16* (2013.01); *F21W 2131/40* (2013.01);
(Continued)

(58) Field of Classification Search
CPC ........ F21K 9/64; H01L 33/502; C09K 11/025
See application file for complete search history.

(56) References Cited

U.S. PATENT DOCUMENTS 4,315,979 A * 2/1982 Brines ................. G21K 4/00
                                                        250/483.1
2007/0125982 A1   6/2007 Tian et al.
(Continued)

FOREIGN PATENT DOCUMENTS

| | | |
|---|---|---|
| JP | 2009-517525 | 4/2009 |
| JP | 2010-506006 | 2/2010 |

(Continued)

*Primary Examiner* — Evan Dzierzynski
(74) *Attorney, Agent, or Firm* — McDermott Will & Emery LLP

(57) ABSTRACT

An oxychloride phosphor of the present disclosure includes divalent Eu arranged as an augmenting agent, at part of locations. The locations correspond to site of at least two kinds of predetermined substances included in a host crystal. A rate of the number of the divalent Eu with respect to the sum of the number of moles of the predetermined substance and the number of moles of the divalent Eu is less than 2%. When the predetermined substance is represented by A, the oxychloride phosphor is represented by a general formula of $xAO.yEuO.SiO_2.zCl$. In this formula, A represents Sr and Ca, or Sr, Ca, and Mg, y indicates a value of not less than 0.002 and not more than 0.02, x+y indicates a value of more than 1.00 and not more than 1.30, and z indicates a value of not less than 0.20 and not more than 0.70.

8 Claims, 6 Drawing Sheets

(51) Int. Cl.
*F21S 2/00* (2016.01)
*F21V 9/16* (2006.01)
*F21W 131/40* (2006.01)
*F21Y 115/30* (2016.01)
*F21Y 115/10* (2016.01)

(52) U.S. Cl.
CPC ........ *F21Y 2115/10* (2016.08); *F21Y 2115/30* (2016.08)

(56) References Cited

U.S. PATENT DOCUMENTS

| | | |
|---|---|---|
| 2008/0128679 A1 | 6/2008 | Tian et al. |
| 2009/0218926 A1 | 9/2009 | Shiraishi et al. |
| 2012/0049115 A1* | 3/2012 | Matsuda ............. C01B 21/0821 |
| | | 252/301.4 F |
| 2012/0256222 A1 | 10/2012 | Sasaki et al. |
| 2013/0063021 A1* | 3/2013 | Yeh ....................... H01L 33/502 |
| | | 313/503 |
| 2013/0076234 A1* | 3/2013 | Enomoto ........... C09K 11/7739 |
| | | 313/503 |

FOREIGN PATENT DOCUMENTS

| | | |
|---|---|---|
| JP | 2011-021062 | 2/2011 |
| JP | 2011-155297 | 8/2011 |
| JP | 2013-175548 | 9/2013 |
| WO | 2007/135926 | 11/2007 |
| WO | 2011/077637 | 6/2011 |
| WO | 2013/190778 | 12/2013 |

\* cited by examiner

OXYCHLORIDE PHOSPHOR, LIGHT EMITTING DEVICE, LIGHTING APPARATUS, AND VEHICLE

CROSS REFERENCES TO RELATED APPLICATIONS

This application claims priority to Japanese Patent Application No. 2013-249806, filed on Dec. 3, 2013, and Japanese Patent Application No. 2014-156318, filed on Jul. 31, 2014, the contents of which are hereby incorporated by reference.

BACKGROUND

1. Technical Field

The present disclosure relates to an oxychloride phosphor, a light emitting device including the oxychloride phosphor, a lighting apparatus including the light emitting device, and a vehicle including the lighting apparatus.

2. Description of the Related Art

In recent years, in view of energy saving, a white light emitting diode (hereinafter referred to as "a white LED") have been widely used. In a general white LED, blue light emitted from a blue light emitting diode chip (hereinafter referred to as "a blue LED chip") is partially color-converted by a phosphor, and white light is produced by mixing the blue light emitted from the blue LED chip and the light color-converted by the phosphor. As the white LED, the structure including a blue LED chip and a yellow phosphor which emits light by excitation light emitted from the blue LED chip has become the mainstream. In addition, development of a light source in which a laser diode (hereinafter referred to as "LD") is arranged in combination with a phosphor has been carried out.

For example, International Publication No. 2011/077637 has disclosed a phosphor which can be applied to a light emitting device configured to emit warm feeling light.

SUMMARY

However, the related techniques described above are still further required to improve the luminous efficiency.

Hence, the present disclosure provides an oxychloride phosphor which suppresses a decrease in luminous efficiency.

An oxychloride phosphor according to one aspect of the present disclosure includes divalent Eu arranged as an augmenting agent, at part of locations, the locations corresponding to sites of at least two kinds of predetermined substances included in a host crystal, and the rate of the number of moles of the divalent Eu with respect to the sum of the number of moles of the predetermined substance and the number of moles of the divalent Eu is less than 2%. In addition, when the predetermined substance is represented by A, the above oxychloride phosphor can be represented by a general formula of $xAO \cdot yEuO \cdot SiO_2 \cdot zCl$, and in this formula, A represents Sr and Ca, or represents Sr, Ca, and Mg, y indicates a value of not less than 0.002 and not more than 0.02, x+y indicates a value of more than 1.00 and not more than 1.30, and z indicates a value of not less than 0.20 and not more than 0.70.

According to the oxychloride phosphor of the present disclosure, the decrease in luminous efficiency can be suppressed.

Additional benefits and advantages of the disclosed embodiments will be apparent from the specification and Figures. The benefits and/or advantages may be individually provided by the various embodiments and features of the specification and Figures, and need not all be provided in order to obtain one or more of the same.

DETAILED DESCRIPTION

Figure 1:
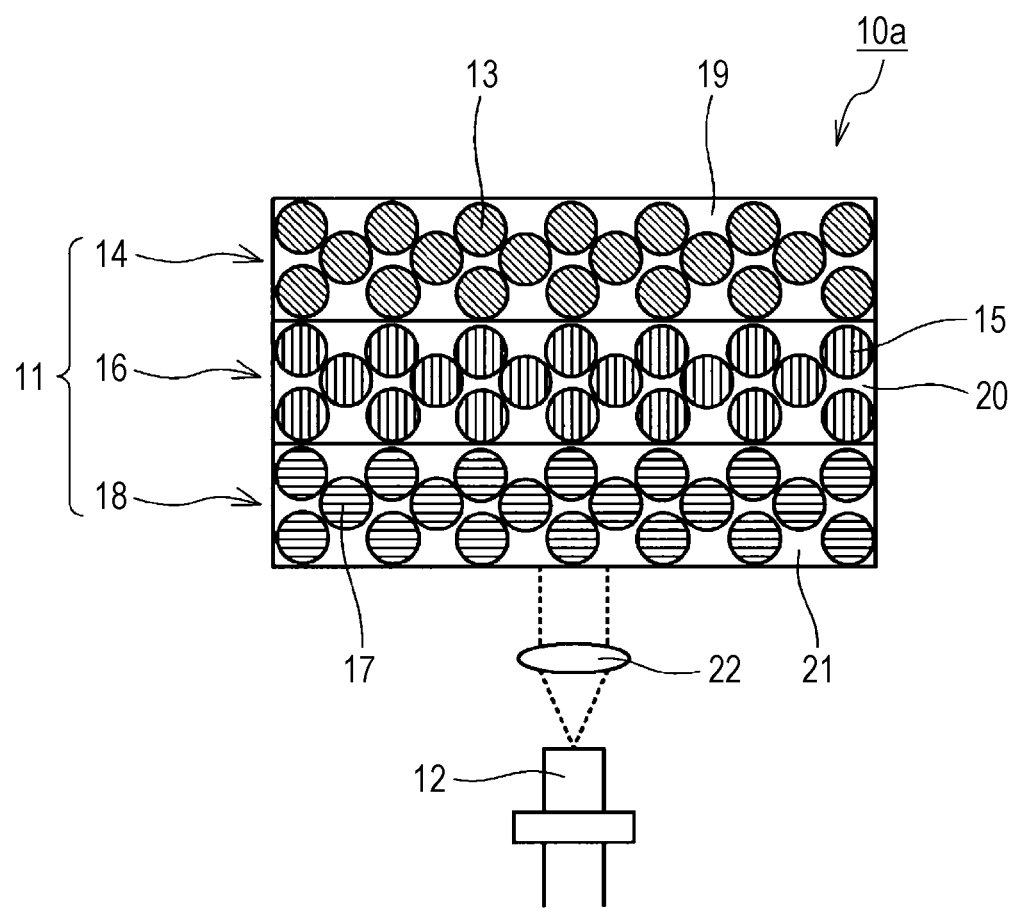
FIG. 1 is a schematic view showing one structural example of an LD light emitting device of the present disclosure.

Through research carried out by the present inventors, it was found that according to the related techniques, when strong excitation light by a laser diode or the like is color-converted by a phosphor, by the luminance saturation caused by an increase in excitation light energy, the luminous efficiency is remarkably decreased.

It is conceived that in a phosphor, divalent Eu is arranged as an augmenting agent, at part of a site of at least one predetermined substance in a host crystal. In this case, there has been a general technical knowledge in which in order to obtain a practical luminous efficiency, the rate of the number of moles of divalent Eu with respect to the sum of the number of moles of the predetermined substance and the number of moles of the divalent Eu is set to be much higher than 2%. However, the present inventors found that when strong excitation light which has not been common in the past is irradiated on a phosphor by a laser diode or the like, by the luminance saturation caused by the increase in excitation light energy, the luminous efficiency is decreased. Hence, through intensive research carried out by the present inventors, in contradiction to the above general technical knowledge, it was found that a phosphor in which divalent Eu is doped at a low concentration of less than 2%, which has not been considered from a practical point of view, is effective to suppress the decrease in luminous efficiency.

A first aspect of the present disclosure provides an oxychloride phosphor containing divalent Eu arranged as an augmenting agent, at part of a site of at least one predetermined substance in a host crystal, and the rate of the number of moles of the divalent Eu with respect to the sum of the number of moles of the predetermined substance and that of the divalent Eu is less than 2%. When the predetermined substance is represented by A, the above oxychloride phosphor is represented by a general formula of $xAO \cdot yEuO \cdot SiO_2 \cdot zCl$, and in this formula, A represents Sr and Ca, or Sr, Ca, and Mg, y indicates a value of not less than 0.002 and not more than 0.02, x+y indicates a value of more than 1.00 and not more than 1.30, and z indicates a value of not less than 0.20 and not more than 0.70.

According to the first aspect, even when strong excitation light is irradiated, a remarkable decrease in luminous efficiency caused by the luminance saturation due to the increase in excitation light energy can be suppressed.

According to a second aspect of the present disclosure, there is provided a light emitting device including: a luminescence element which emits excitation light; and a wavelength converting unit which contains the oxychloride phosphor of the first aspect and which emits light having a wavelength different from that of the excitation light emitted from the luminescence element when receiving the excitation light therefrom.

According to the second aspect, even when strong excitation light is emitted from the luminescence element, a light emitting device which suppress the decrease in luminous efficiency is provided.

According to a third aspect of the present disclosure, the luminescence element of the second aspect includes a laser diode.

According to the third aspect, a light emitting device having a high luminance and a high efficiency is provided.

According to a fourth aspect of the present disclosure, in the light emitting device of the second or the third aspect, the energy density of the excitation light irradiated on the wavelength converting unit is 0.5 kW/cm$^2$ or more.

According to the fourth aspect, even when the energy density of the excitation light irradiated on the wavelength converting unit is high, such as 0.5 kW/cm$^2$ or more, the decrease in luminous efficiency caused by the luminance saturation is suppressed, and a high luminous efficiency is obtained.

According to a fifth aspect of the present disclosure, in the light emitting device of the second or the third aspect, the energy density of the excitation light irradiated on the wavelength converting unit is 1.0 kW/cm$^2$ or more.

According to the fifth aspect, even when the energy density of the excitation light irradiated on the wavelength converting unit is high, such as 1.0 kW/cm$^2$ or more, the decrease in luminous efficiency caused by the luminance saturation is suppressed, and a high luminous efficiency is obtained.

According to a sixth aspect of the present disclosure, in the light emitting device of one of the second to the fifth aspects, the peak wavelength of the excitation light emitted from the luminescence element is not less than 380 and less than 420 nm.

According to the sixth aspect, when a luminescence element emitting excitation light having the peak wavelength as described above is used in combination with a predetermined phosphor containing the above oxychloride phosphor, at least one of the color rendering property and the color reproducibility is improved.

According to a seventh aspect of the present disclosure, there is provided a lighting apparatus including: the light emitting device according to one of the second to the sixth aspects; and a light emission system which guides light from the light emitting device to the outside.

According to the seventh aspect, a lighting apparatus having a high luminance and a high efficiency is provided.

According to an eighth aspect of the present disclosure, there is provided a vehicle including the lighting apparatus of the seventh aspect as a head lamp provided at a front portion of the vehicle.

According to the eighth aspect, since the lighting apparatus having a high luminance and a high efficiency is used as the head lamp, at least one of the energy saving and the safety improvement of the vehicle is achieved.

Hereinafter, the embodiments of the present disclosure will be described in detail. However, the present disclosure is not limited to the following embodiments and may be appropriately changed or modified without departing from the technical scope of the present disclosure.

<Phosphor>

First, the oxychloride phosphor of the present disclosure will be described. The oxychloride phosphor contains divalent Eu arranged as an augmenting agent, at part of a site of at least one predetermined substance in a host crystal. In the oxychloride phosphor, the rate of the number of moles of the divalent Eu with respect to the sum of the number of moles of the predetermined substance and the number of the divalent Eu is less than 2%. When the predetermined substance is represented by A, this oxychloride phosphor is represented by a general formula of $xAO \cdot yEuO \cdot SiO_2 \cdot zCl$. In this formula, A represents Sr and Ca, or Sr, Ca, and Mg. y indicates a value of not less than 0.002 and not more than 0.02. x+y indicates a value of more than 1.00 and not more than 1.30. z indicates a value of not less than 0.20 and not more than 0.70.

Since divalent Eu is doped in the oxychloride phosphor at a low concentration as described above, the decrease in luminous efficiency caused by the luminance saturation is suppressed. As a result, even when excitation light having high excitation light energy is irradiated on the oxychloride phosphor, a high luminous efficiency is achieved. Since y indicates not less than 0.002 and not more than 0.02, x+y indicates more than 1.00 and not more than 1.30, and z indicates not less than 0.20 and not more than 0.70, a high luminous efficiency is achieved.

The oxychloride phosphor as described above may be manufactured, for example, by the following method.

As a raw material for strontium (Sr), a strontium compound, such as strontium hydroxide, strontium carbonate, strontium nitrate, strontium halogenate, or strontium oxalate, each of which has a high purity (purity: 99% or more) and can be formed into strontium oxide by firing, may be used, or strontium oxide having a high purity (purity: 99% or more) may also be used.

As a raw material for calcium (Ca), a calcium compound, such as calcium hydroxide, calcium carbonate, calcium nitrate, calcium halogenate, or calcium oxalate, each of which has a high purity (purity: 99% or more) and can be formed into calcium oxide by firing, may be used, or calcium oxide having a high purity (purity: 99% or more) may also be used.

As a raw material for magnesium (Mg), a magnesium compound, such as magnesium hydroxide, magnesium carbonate, magnesium nitrate, magnesium halogenate, magnesium oxalate, or basic magnesium carbonate, each of which has a high purity (purity: 99% or more) and can be formed into magnesium oxide by firing, may be used, or magnesium oxide having a high purity (purity: 99% or more) may also be used.

As a raw material for europium (Eu), an europium compound, such as europium hydroxide, europium carbonate, europium nitrate, europium halogenate, or europium oxalate, each of which has a high purity (purity: 99% or more) and can be formed into europium oxide by firing, may be used, or europium oxide having a high purity (purity: 99% or more) may also be used.

As a raw material for silicon (Si), various oxide raw materials, such as silica ($SiO_2$), may be used.

In addition, as a raw material for chlorine (Cl), for example, strontium chloride or calcium chloride may be used.

The above raw materials are mixed together. As a method for mixing the raw materials, either wet mixing performed in a solvent or dry mixing with the use of a dry powder may be used. For mixing of the raw materials, for example, a ball mill, a medium mixing mill, a planetary ball mill, a vibrating mill, a jet mill, a V-type blender, or a mixer, each of which is used for industrial purpose, may be used.

Next, a mixed powder thus obtained was fired. The firing of the mixed powder is performed in a temperature range of 1,000° C. to 1,200° C. for 1 to 10 hours in a mixed gas atmosphere containing nitrogen and hydrogen.

As a furnace used for the firing, a furnace which is generally used for industrial purpose may be used, and for example, a continuous type furnace such as a pusher configuration furnace, or a batch-wise electric or gas furnace may be used.

As the raw material, when a compound, such as a hydroxide, a carbonate, a nitrate, a halide, or an oxalate, each of which can be formed into an oxide by firing, is used, for example, prior to final firing, the mixed powder is calcined in a temperature range of 800° C. to 1,000° C.

The powdered phosphor obtained as described above may be again pulverized using a ball mill, a jet mill, and so on, if necessary, may be further washed and classified. Thus, the particle size distribution and fluidity of the powdered phosphor is controlled. As a result, the oxychloride phosphor described above is obtained.

<Light Emitting Device>

Next, an example of the light emitting device will be described. The light emitting device of the present disclosure includes a luminescence element and a wavelength converting unit. The luminescence element emits excitation light. The wavelength converting unit contains the above oxychloride phosphor, and when receiving the excitation light from the luminescence element, the wavelength converting unit emits light having a wavelength different from that of the excitation light. This luminescence element is, for example, a semiconductor luminescence element. This luminescence element may be either a laser diode (LD) or a light emitting diode (hereinafter referred to as "LED"). The energy density of the excitation light from the luminescence element irradiated on the wavelength converting unit is, for example, 0.2 kW/cm$^2$ or more, and may be 0.3 kW/cm$^2$ or more, 0.5 kW/cm$^2$ or more, 1.0 kW/cm$^2$ or more, or 1.5 kW/cm$^2$ or more.

The peak wavelength of the excitation light from this luminescence element is, for example, not less than 380 and less than 420 nm. For example, when this luminescence element is used in combination with three types of phosphors, such as a blue phosphor, a green phosphor, and a red phosphor, the color rendering property and/or the color reproducibility can be improved. In this case, the above oxychloride phosphor is used as one of the three types of phosphors. In addition, when this luminescence element is used in combination with two types of phosphors, such as a blue phosphor and a yellow phosphor, at least one of the color rendering property and the color reproducibility also is improved. In this case, the above oxychloride phosphor is used as one of the two types of phosphors.

Next, as the light emitting device, a laser diode light emitting device will be described by way of example. In addition, hereinafter, a laser diode is abbreviated as an LD, and a light emitting diode is abbreviated as an LED. The LD light emitting device includes an LD luminescence element as the luminescence element. FIG. 1 is a view showing a schematic structure of one example of the LD light emitting device. An LD light emitting device 10a includes a wavelength conversion member 11 as the wavelength converting unit and includes an LD luminescence element 12.

In general, LD is able to emit light having a high light energy density as compared to that of light emitted from an LED. Accordingly, by the use of the LD luminescence element 12, a high-output light emitting device can be realized.

The LD luminescence element 12 emits light having a wavelength that can excite the above oxychloride phosphor. As the LD luminescence element 12, for example, a luminescence element including an LD which emits blue light, blue-violet light, or ultraviolet light may be used. In this specification, the blue-violet light indicates light having a peak wavelength of not less than 380 and less than 420 nm. In general, an LD which emits blue-violet light has a high luminous efficiency as compared to that of an LD which emits ultraviolet light, and when the emission peak wavelength is 405 nm, the luminous efficiency is maximized. The emission peak wavelength of the LD luminescence element 12 may be either 385 nm or more or 390 nm or more. In addition, the emission peak wavelength of the LD luminescence element 12 may be either 415 nm or less or 410 nm or less.

The LD luminescence element 12 may be formed from one LD or a plurality of LDs optically coupled to each other. The LD luminescence element 12 includes, for example, a light emitting layer formed from a nitride semiconductor having a non-polar or a semi-polar growth surface. Hereinafter, the case in which the LD luminescence element 12 emits blue-violet light will be described by way of example.

The wavelength conversion member 11 includes a phosphor, and this phosphor converts light emitted from the LD luminescence element 12 into light having a longer wavelength than that emitted therefrom. The phosphor of the wavelength conversion member 11 includes the above oxychloride phosphor. The wavelength conversion member 11 may include a phosphor besides the above oxychloride phosphor in accordance with desired emission light color of the light emitting device 10a. The wavelength conversion member 11 may be formed as one wavelength conversion layer in which at least two types of phosphors are mixed with each other. The wavelength conversion member 11 may be formed by laminating at least two wavelength conversion layers each containing at least one type of phosphor.

As shown in FIG. 1, the wavelength conversion member 11 is formed, for example, by laminating a first phosphor layer 14 containing first phosphor particles 13, a second phosphor layer 16 containing second phosphor particles 15, and a third phosphor layer 18 containing third phosphor particles 17. For example, the first phosphor particle 13 is the above oxychloride phosphor and is a blue phosphor. For example, the second phosphor particle 15 is a green phosphor, and the third phosphor particle 17 is a red phosphor.

The first phosphor layer 14, the second phosphor layer 16, and the third phosphor layer 18 include a binder 19, a binder 20, and a binder 21, respectively, each of which is disposed between the phosphor particles. Each of the binder 19, the binder 20, and the binder 21 may be formed from either an inorganic material or an organic material. Each of the binder 19, the binder 20, and the binder 21 are formed, for example, from a resin, a glass, or a transparent crystal material. The binder 19, the binder 20, and the binder 21 may be formed from the same type of material or different types of materials. The first phosphor layer 14, the second phosphor layer 16, and the third phosphor layer 18 each may be formed only from the respective phosphor particles.

As shown in FIG. 1, between the wavelength conversion member 11 and the LD luminescence element 12, a light entry system 22 which guides light from the LD luminescence element 12 to the third phosphor layer 18 may be provided. The light entry system 22 includes, for example, a lens, a mirror, and/or an optical fiber, and so on.

Next, the operation of the LD light emitting device 10a will be described. The blue-violet light emitted from the LD luminescence element 12 enters the third phosphor layer 18 of the wavelength conversion member 11 through the light entry system 22. By this incident light, the third phosphor particles 17 of the third phosphor layer 18 are excited to emit red light. In addition, blue-violet light which is emitted from the LD luminescence element 12 and which is allowed to pass through the third phosphor layer 18 without being absorbed therein enters the second phosphor layer 16. By this incident light, the second phosphor particles 15 of the second phosphor layer 16 are excited to emit green light. In addition, blue-violet light which is emitted from the LD luminescence element 12 and which is allowed to pass through the second phosphor layer 16 without being absorbed therein enters the first phosphor layer 14. By this incident light, the first phosphor particles 13 of the first phosphor layer 14 are excited to emit blue light. The red light, green light, and blue light described above are mixed together to produce while light.

The thicknesses of the first phosphor layer 14, the second phosphor layer 16, and the third phosphor layer 18 are adjusted, for example, so as not to allow the blue-violet light emitted from the LD luminescence element 12 to pass through the first phosphor layer 14. Alternatively, the thicknesses of the first phosphor layer 14, the second phosphor layer 16, and the third phosphor layer 18 may be determined so as to allow the blue-violet light emitted from the LD luminescence element 12 to pass through the first phosphor layer 14, and a layer absorbing or reflecting blue-violet light passing through the first phosphor layer 14 may be provided in the LD light emitting device 10a. As a result, coherent laser light from the LD luminescence element 12 is restricted from being emitted to the outside, and hence, the safety of the LD light emitting device 10a is enhanced.

Modified Example

The structure of the LD light emitting device 10a is not limited to that shown in FIG. 1. For example, the positions of the first phosphor layer 14, the second phosphor layer 16, and the third phosphor layer 18 may be changed to each other. In addition, instead of using the second phosphor layer 16 and the third phosphor layer 18, a fourth phosphor layer containing yellow phosphor particles may be provided.

Figure 2:
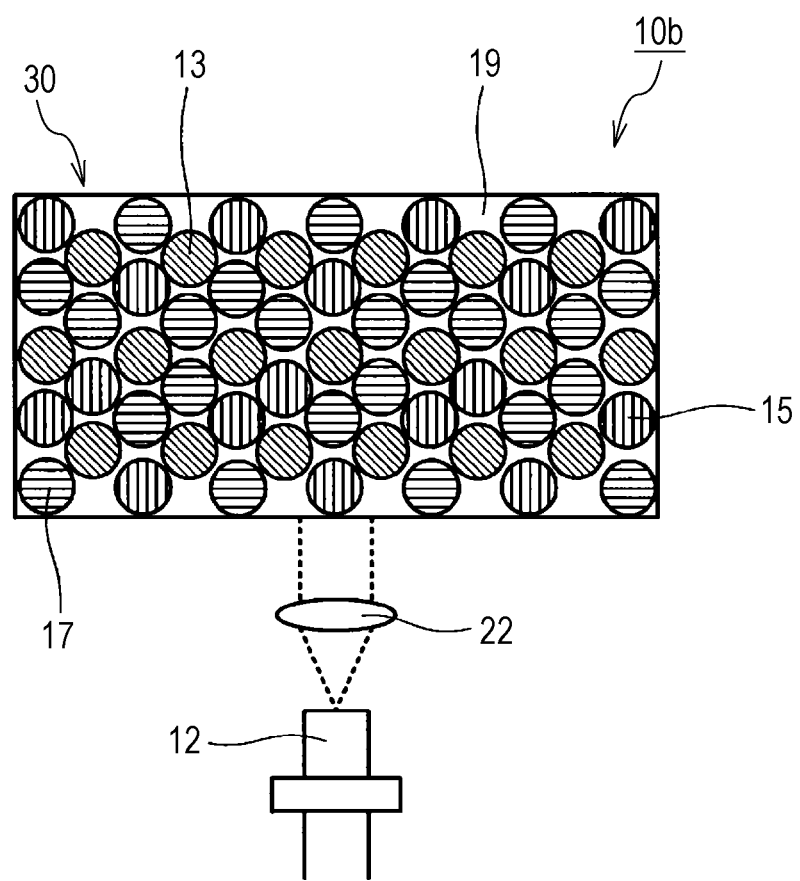
FIG. 2 is a schematic view showing the structure of an LD light emitting device according to a modified example.

In addition, as shown in FIG. 2, in an LD light emitting device 10b which is one modified example, instead of using the first phosphor layer 14, the second phosphor layer 16, and the third phosphor layer 18, a fifth phosphor layer 30 formed by mixing three types of phosphor particles (the first phosphor particles 13, the second phosphor particles 15, and the third phosphor particles 17) may be provided.

According to the above LD light emitting device, when the LD luminescence element is a high-output type, in particular, the luminous efficiency of the LD light emitting device is improved. In addition, when the LD light emitting device is formed as a white light emitting device, at least one of the color rendering property and the color reproducibility is improved.

<Lighting Apparatus>

Next, an example of the lighting apparatus will be described. The lighting apparatus of the present disclosure includes the above light emitting device and a light emission system which guides light from this light emitting device to the outside. As the lighting apparatus, for example, there may be mentioned: (1) a general lighting apparatus such as a ceiling light; (2) a special lighting apparatus, such as a spot light, lighting for stadium, or lighting for studio; and (3) a lighting apparatus for vehicle, such as a head lamp, a daytime running lamp (DRL). As the lighting apparatus, a lighting apparatus for vehicle (hereinafter referred to as "vehicle lighting apparatus" in some cases) will be described by way of example. In addition, in this specification, the "vehicle" indicates, for example, an automobile, a railway vehicle, a streetcar, a two-wheel vehicle, such as a motorcycle, or a special vehicle for building-purpose or agriculture-purpose.

Figure 3:
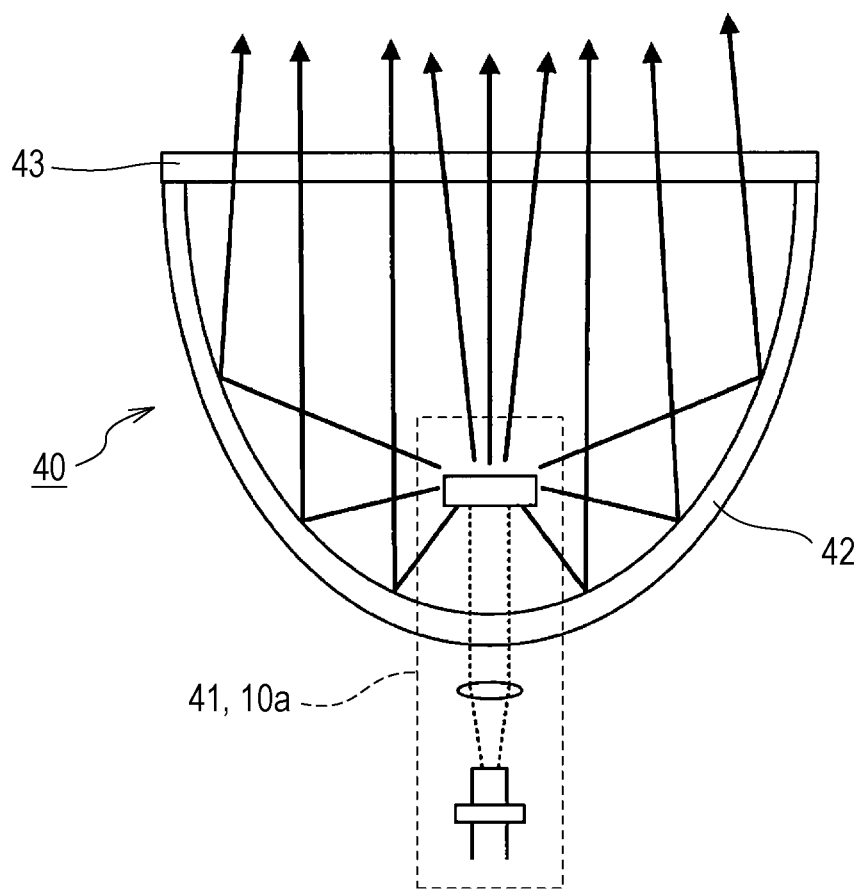
FIG. 3 is a schematic view showing one structural example of a lighting apparatus for vehicle of the present disclosure.

FIG. 3 shows a schematic structure of a vehicle lighting apparatus 40 which is one example of the lighting apparatus of the present disclosure. The vehicle lighting apparatus 40 includes a light source portion 41 having the LD light emitting device 10a described above and a light emission system 42 which guides light emitted from the light source portion 41 to a front side. Since the LD light emitting device 10a is used for the light source portion 41, a high light output is realized. When blue-violet light or ultraviolet light is emitted from the LD light emitting device 10a, in order to prevent the blue-violet light or the ultraviolet light emitted therefrom from leaking to the outside, the vehicle lighting apparatus 40 may also include a wavelength cut filter 43 which absorbs or reflects blue-violet light or ultraviolet light. The light emission system 42 is, for example, a reflector. The light emission system 42 includes, for example, a film formed of a metal, such as aluminum (Al) or silver (Ag). The metal film described above may be provided with a protective film on the surface thereof. When used as a head lamp, the vehicle lighting apparatus 40 may be either a reflector type head lamp or a projector type head lamp.

According to the lighting apparatus described above, a lighting apparatus having a high luminous efficiency is provided.

<Vehicle>

Next, an example of the vehicle will be described. The vehicle of the present disclosure includes the lighting apparatus described above as a head lamp provided at a front side of the vehicle. The vehicle is, for example, an engine vehicle, an electric vehicle, or a hybrid vehicle.

Figure 4:
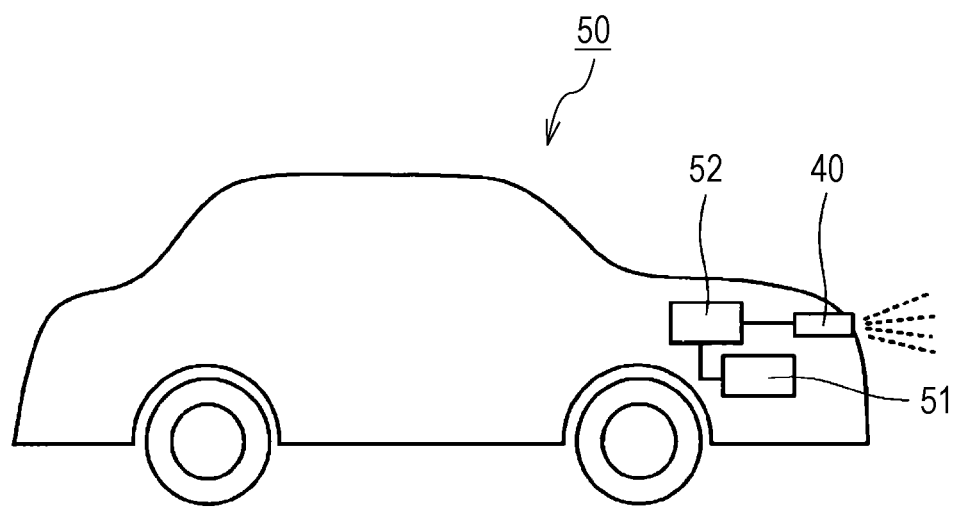
FIG. 4 is a view showing one example of a vehicle of the present disclosure.

FIG. 4 shows a schematic structure of a vehicle 50 which is one example of the vehicle of the present disclosure. The vehicle 50 includes the vehicle lighting apparatus 40 as a head lamp. In addition, as shown in FIG. 4, the vehicle 50 may include a generator 51 which is rotatably driven by a driving source, such as an engine, to generate an electric power. Furthermore, the vehicle 50 may include an electric power supply source 52 which is a chargeable and dischargeable secondary battery. The electric power generated by the generator 51 is stored in the electric power supply source 52. The vehicle lighting apparatus 40 is turned on by an electric power supplied from the electric power supply source 52.

<Lighting System>

Next, an example of a lighting system will be described. The lighting system includes the light emitting device described above and a light emission system which guides light emitted from the light emitting device to the outside.

Figure 5:
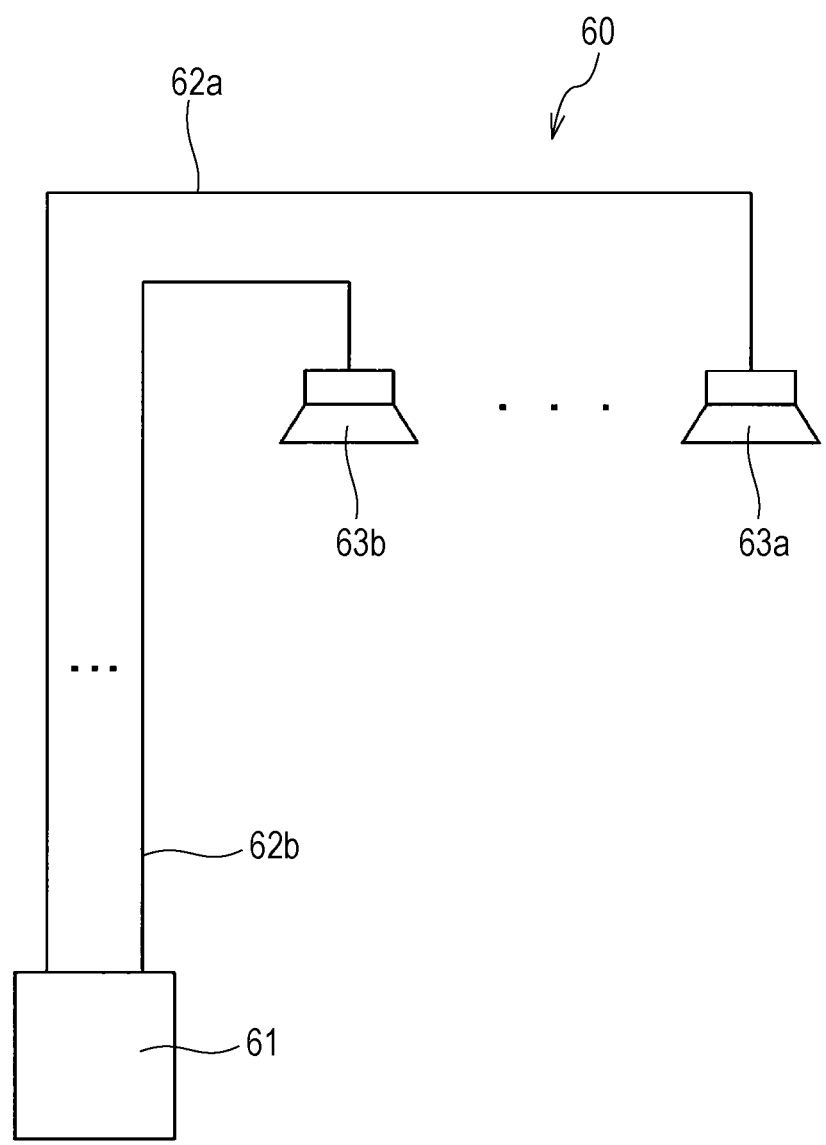
FIG. 5 is a view showing one example of a lighting system of the present disclosure.

FIG. 5 shows a schematic structure of a lighting system 60 which is one example of the lighting system of the present disclosure. The lighting system 60 is, for example, a lighting system for large-scale facilities, such as a gymnasium and a music hall. The lighting system 60 includes an excitation light source portion 61 having a plurality of the LDs described in the column of the above <Light Emitting Device>, optical fibers 62a and 62b, and light emission units 63a and 63b. One terminal of the optical fiber 62a and one terminal of the optical fiber 62b are connected to respective LDs of the excitation light source portion 61. The other terminal of the optical fiber 62a and the other terminal of the optical fiber 62b are connected to the light emission units 63a and 63b, respectively.

The light emission units 63a and 63b each include the "wavelength converting unit" described in the column of the above <Light Emitting Device> and the "light emission system" described in the <Lighting Apparatus>. When blue-violet light or ultraviolet light is emitted from the LD, in order to prevent the blue-violet light or the ultraviolet light emitted from the LD from leaking to the outside, the light emission units 63a and 63b each may include a wavelength cut filter (not shown) which absorbs or reflects blue-violet light or ultraviolet light. The light emission system of each of the light emission units 63a and 63b is, for example, a reflector.

Excitation light beams emitted from the LDs of the excitation light source portion 61 are allowed to pass through the optical fibers 62a and 62b and are then irradiated on the wavelength converting units of the light emission units 63a and 63b. The phosphors of the wavelength converting units which receive the excitation light beams emit light beams, and the light beams from the individual wavelength converting units are guided to the outside by the individual light emission systems. When blue light is emitted from the LD, for example, the light emission units 63a and 63b each have a scattering portion which scatters at least part of this blue light, and light obtained by mixing the blue light scattered by the scattering portion and light wavelength-converted by the wavelength converting unit is guided to the outside by the light emission system.

When the optical fibers are used as described above, the LD functioning as a heat source and the phosphor may be disposed with a long distance therebetween. Therefore, heat elimination performance can be improved. Accordingly, the size and the weight of a heat sink of each of the light emission units 63a and 63b are reduced, and the fitting performance of the light emission units 63a and 63b can be improved.

EXAMPLES

Hereinafter, examples of the present disclosure will be described. Incidentally, the present disclosure is not limited to the following examples.
(Manufacturing Example of Phosphor)

After $SrCO_3$ (purity: 99.9%, average particle diameter: 1 μm), $CaCO_3$ (purity: 99.9%, average particle diameter: 1 μm), $Eu_2O_3$ (purity: 99.9%, average particle diameter: 1 μm), $MgCO_3$ (purity: 99.9%, average particle diameter: 0.5 μm), $SiO_2$ (purity: 99.9%, average particle diameter: 2 μm), and $SrCl_2$ (purity: 99.9%) used as starting raw materials were weighed to have a predetermined composition, those starting raw materials were wet-mixed in purified water using a ball mill. In this specification, the average particle diameter indicates an average particle diameter measured by a microscopic method.

After this mixture was dried at 150° C. for 10 hours, a dried powder thus obtained was calcined in the air at 800° C. for 4 hours. This calcined product was fired at 1,100° C. for 4 hours in a mixed gas of nitrogen and hydrogen (volume percentage of hydrogen: 3 vol %), so that phosphor samples with sample Nos. 1 to 12 shown in Table 1 were obtained. In addition, the phosphor samples with sample Nos. 1 to 12 are each represented by a general formula of $xAO.yEuO.SiO_2.zCl$, and A represents Sr and Ca, or Sr, Ca, and Mg.

In addition, after $Y_2O_3$ (purity: 99.9%, average particle diameter: 1 μm), $Eu_2O_3$ (purity: 99.9%, average particle diameter: 1 μm), $Al_2O_3$ (purity: 99.9%, average particle diameter: 0.1 μm), and $CeO_2$ (purity: 99.9%, average particle diameter: 0.3 μm) used as starting raw materials were weighed to have a predetermined composition, those starting raw materials were wet-mixed in purified water using a ball mill.

After this mixture was dried at 150° C. for 10 hours, a dried powder thus obtained was fired in a nitrogen atmosphere at 1,600° C. for 4 hours, so that phosphor samples with sample Nos. 13 to 16 were obtained.

Tables 1 and 2 show the composition ratios of the phosphor samples with the sample Nos. 1 to 16 thus formed and the relative values of light quanta thereof obtained when blue-violet light having an output of 0.1 W (energy density of excitation light irradiated on the phosphor sample: 0.1 $kW/cm^2$) and blue-violet light having an output of 2 W (energy density of excitation light irradiated on the phosphor sample: 2.0 $kW/cm^2$) are irradiated on the phosphor sample using LD having a peak wavelength of 405 nm. The relative value of light quanta is shown as a relative value with respect to the value of light quanta measured when blue-violet light having an output of 0.1 W is irradiated on the phosphor sample with sample No. 1. In addition, in order to suppress the influence of heat generation based on blue-violet light irradiated by the LD, the phosphor sample was formed on an aluminum substrate, and the temperature of the phosphor sample was maintained at 60° C. or less by cooling the aluminum substrate. In Tables 1 and 2, the sample provided with a mark (*) in front of the sample No. indicates a comparative example, and the sample provided with no mark (*) in front of the sample No. indicates an example. That is, sample Nos. 1 to 4 and 13 to 16 indicate comparative examples, and sample Nos. 5 to 12 indicate examples.

TABLE 1

| Sample No. | A | y | x + y | z | y/(x + y) | Relative Value of Light Quanta Input 0.1 W | Input 2 W |
|---|---|---|---|---|---|---|---|
| *1 | $Sr_{0.72}Ca_{0.38}$ | 0.10 | 1.20 | 0.50 | 0.0833 | 100 | 8 |
| *2 | $Sr_{0.72}Ca_{0.43}$ | 0.05 | 1.20 | 0.50 | 0.0417 | 110 | 22 |
| *3 | $Sr_{0.72}Ca_{0.43}$ | 0.05 | 0.80 | 0.50 | 0.0625 | 86 | 12 |
| *4 | $Sr_{0.72}Ca_{0.43}$ | 0.05 | 1.50 | 0.50 | 0.0333 | 70 | 20 |
| 5 | $Sr_{0.72}Ca_{0.46}$ | 0.02 | 1.20 | 0.50 | 0.0167 | 95 | 52 |
| 6 | $Sr_{0.72}Ca_{0.475}$ | 0.005 | 1.20 | 0.50 | 0.0042 | 78 | 54 |
| 7 | $Sr_{0.72}Ca_{0.478}$ | 0.002 | 1.20 | 0.50 | 0.0017 | 58 | 48 |
| 8 | $Sr_{0.72}Ca_{0.35}Mg_{0.10}$ | 0.005 | 1.20 | 0.50 | 0.0042 | 70 | 51 |

TABLE 1-continued

| Sample No. | A | y | x + y | z | y/(x + y) | Relative Value of Light Quanta Input 0.1 W | Input 2 W |
|---|---|---|---|---|---|---|---|
| 9 | $Sr_{0.60}Ca_{0.395}$ | 0.005 | 1.00 | 0.50 | 0.0050 | 71 | 47 |
| 10 | $Sr_{0.80}Ca_{0.495}$ | 0.005 | 1.30 | 0.50 | 0.0038 | 71 | 47 |
| 11 | $Sr_{0.72}Ca_{0.475}$ | 0.005 | 1.20 | 0.20 | 0.0042 | 73 | 50 |
| 12 | $Sr_{0.72}Ca_{0.475}$ | 0.005 | 1.20 | 0.70 | 0.0042 | 83 | 53 |

TABLE 2

| Sample No. | Composition | Relative Value of Light Quanta Input 0.1 W | Input 2 W |
|---|---|---|---|
| *13 | $Y_{2.85}Ce_{0.15}Al_5O_{12}$ | 43 | 40 |
| *14 | $Y_{2.94}Ce_{0.06}Al_5O_{12}$ | 34 | 31 |
| *15 | $Y_{1.5}Eu_{0.5}O_3$ | 16 | 15 |
| *16 | $Y_{1.8}Eu_{0.2}O_3$ | 9 | 8 |

As apparent from Tables 1 and 2, in a phosphor (such as a phosphor represented by a general formula of $xAO.yEuO.SiO_2.zCl$) in which divalent Eu functions as the luminescent center, at an Eu concentration at which the relative value of light quanta is high when the excitation light energy by blue-violet light irradiation at 405 nm is low (see sample Nos. 1 and 2), although the decrease in relative value of light quanta is remarkable by the increase in excitation light energy, when the Eu concentration is low, the decrease in relative value of light quanta caused by the increase in excitation light energy is low (see sample Nos. 5 to 12). On the other hand, in a phosphor (such as $Y_3Al_5O_{12}$: $Ce^{3+}$) in which trivalent Ce functions as the luminescent center or in a phosphor (such as $Y_2O_3$: $Eu^{3+}$) in which trivalent Eu functions as the luminescent center, even when the concentration of the luminescent center is increased, the decrease in relative value of light quanta caused by the high excitation light energy is significantly low (see sample Nos. 13 to 16). Hence, the tendency of the decrease in relative value of light quanta caused by the increase in excitation light energy, which was observed in sample Nos. 1 to 12, is a specific phenomenon limited to a phosphor containing divalent Eu as the luminescent center.

Figure 6:
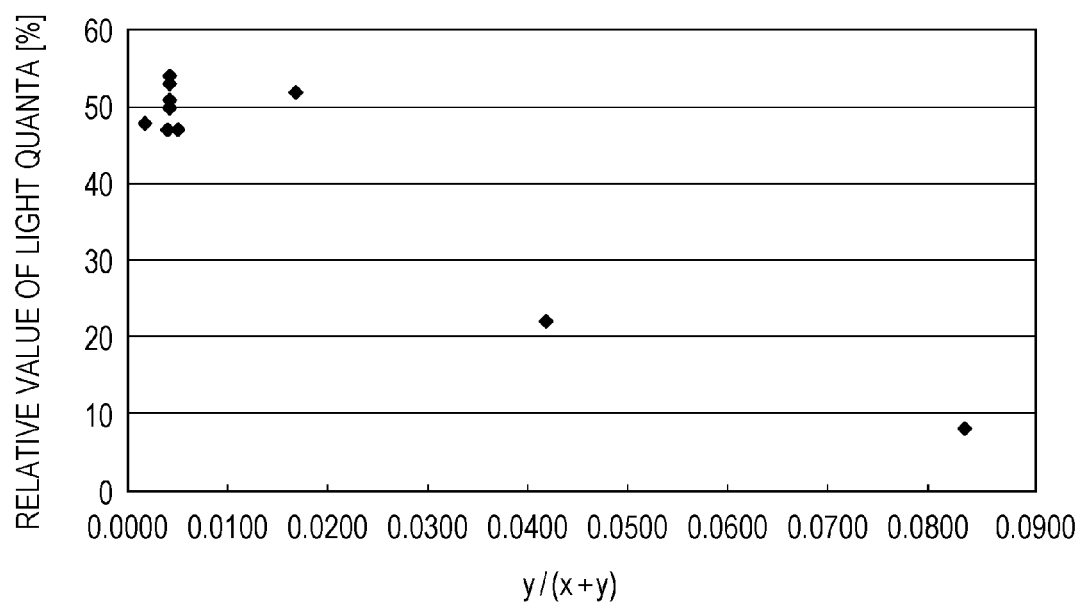
FIG. 6 is a graph showing the relationship between the relative value of light quanta and the value of y/(x+y) of phosphor samples shown in Table 1.

FIG. 6 shows the relationship between the value of y/(x+y) and the relative value of light quanta obtained when blue-violet light having an output of 2 W is irradiated on each of the phosphor samples with sample Nos. 1, 2 and 5 to 12. FIG. 6 is prepared based on the results shown in Table 1 which shows the relationship between the value of y/(x+y) and the relative value of light quanta obtained when blue-violet light having an output of 2 W is irradiated on each of the phosphor samples with sample Nos. 1, 2 and 5 to 12. From FIG. 6, it can be understood that the relative value of light quanta is decreased when the value of y/(x+y) is high, and that the relative value of light quanta is increased when the value of y/(x+y) is low. When the value of y/(x+y) is set to less than 0.02, a high relative value of light quanta is realized. That is, the results described above show that a phosphor in which divalent Eu is doped at a low concentration of less than 2%, which has not been practically considered in the past, is effective to suppress the decrease in luminous efficiency.

What is claimed is:

1. An oxychloride phosphor comprising:
   divalent Eu arranged as an augmenting agent at part of locations, the locations corresponding to sites of at least two kinds of predetermined substances included in a host crystal,
   wherein a rate of the number of moles of the divalent Eu with respect to the sum of the number of moles of the predetermined substance and the number of moles of the divalent Eu is less than 2%, and
   when the predetermined substance is represented by A, the oxychloride phosphor is represented by a general formula of $xAO.yEuO.SiO_2.zCl$
   wherein A represents Sr and Ca, or represents Sr, Ca, and Mg,
   y indicates a value of not less than 0.002 and not more than 0.02,
   x+y indicates a value of more than 1.00 and not more than 1.30, and
   z indicates a value of not less than 0.20 and not more than 0.70.

2. A light emitting device comprising:
   a luminescence element emitting excitation light; and
   a wavelength converting unit which contains the oxychloride phosphor according to claim 1 and which emits light when the wavelength converting unit receives the excitation light emitted from the luminescence element, the light having a wavelength different from that of the excitation light.

3. The light emitting device according to claim 2, wherein the luminescence element includes a laser diode.

4. The light emitting device according to claim 2, wherein the excitation light irradiated on the wavelength converting unit has an energy density of 0.5 $kW/cm^2$ or more.

5. The light emitting device according to claim 2, wherein the excitation light irradiated on the wavelength converting unit has an energy density of 1.0 $kW/cm^2$ or more.

6. The light emitting device according to claim 2, wherein the excitation light emitted from the luminescence element has a peak wavelength of not less than 380 and less than 420 nm.

7. A lighting apparatus comprising:
   the light emitting device according to claim 2; and
   a light emission system which guides light emitted from the light emitting device to the outside.

8. A vehicle comprising:
   the lighting apparatus according to claim 7,
   wherein the lighting apparatus is provided as a head lamp at a front portion of the vehicle.

* * * * *